United States Patent [19]

Moulsley

[11] Patent Number: 5,856,666
[45] Date of Patent: Jan. 5, 1999

[54] MULTIPLEXER CIRCUIT

[75] Inventor: Timothy J. Moulsley, Caterham, England

[73] Assignee: U.S. Philips Corporation, New York, N.Y.

[21] Appl. No.: 751,595

[22] Filed: Nov. 18, 1996

[30] Foreign Application Priority Data

Dec. 1, 1995 [GB] United Kingdom ............... 9524560

[51] Int. Cl.$^6$ .................................................. H01L 27/00
[52] U.S. Cl. ...................................... 250/208.1; 348/308
[58] Field of Search ........................... 250/208.1, 208.4; 327/408, 409, 514, 515; 348/302, 303, 304, 305, 307, 308, 310

[56] References Cited

U.S. PATENT DOCUMENTS

| | | | |
|---|---|---|---|
| 4,117,510 | 9/1978 | Ohta et al. ........................... | 327/515 |
| 5,148,030 | 9/1992 | Kiri et al. ........................... | 250/370 |
| 5,536,932 | 7/1996 | Hack et al. ........................... | 250/208.1 |

Primary Examiner—Edward P. Westin
Assistant Examiner—Kevin Pyo
Attorney, Agent, or Firm—Steven R. Biren

[57] ABSTRACT

An array reading or addressing circuit which enables the signals stored in an array of electrical elements to be individually read and which reduces the number of connections to the array of electrical elements. The circuit includes a plurality of terminals 32, each terminal being connected to a signal reading device 30 or address signal generating device 31 through a respective switch S. The elements 12 of the array are each connected to a unique combination of the terminals, and when a combination of switches S are in a conducting state, electrical signals of a combination of electrical elements are fed to the signal reading device 30, or addressed by the address signal. The output signals for different switch combinations, which each represent combinations of pixel values, are processed to enable the signal from each electrical element to be determined.

16 Claims, 4 Drawing Sheets

| MEASUREMENT | SWITCH SETTING | | | PIXELS MEASURED |
| --- | --- | --- | --- | --- |
| | S1 | S2 | S3 | |
| M1 | 0 | 0 | 1 | A C E G |
| M2 | 0 | 1 | 0 | A B E F |
| M3 | 0 | 1 | 1 | A B C E F G |
| M4 | 1 | 0 | 0 | A B C D |
| M5 | 1 | 0 | 1 | A B C D E G |
| M6 | 1 | 1 | 0 | A B C D E F |
| M7 | 1 | 1 | 1 | A B C D E F G |

FIG. 4A

| PIXEL | CALCULATION |
| --- | --- |
| G | M7−M6 |
| F | M7−M5 |
| E | M7−M3 |
| D | M5−M4−G |
| C | M3−M2−G |
| B | M3−M1−F |
| A | M1−C−E−G |

FIG. 4B

MULTIPLEXER CIRCUIT

BACKGROUND OF THE INVENTION

This invention relates to the addressing of arrays of electrical elements and concerns a multiplexer circuit for reading the signals from elements of such an array or addressing those elements. In particular, the invention concerns a multiplexer circuit for reading or addressing an array of device elements formed with thin-film circuitry. The device elements may be image sensor elements (for example photosensitive diodes) of a large area image sensor, or display elements of a flat panel display (for example a liquid crystal display), or several other types of device element.

Addressing an array of device elements in rows and columns on a large area circuit requires each element to be connected to a unique pair of row and column conductors. In the case of an image sensor, a resolution of 300 dpi (dots per inch) may be required so that for an A4 large area image sensor, 2,500 and 3,500 rows and columns are required respectively (with the rows parallel to the long side of the A4 page). Problems therefore arise in forming the interconnections to the large area circuit and the use of multiplexer circuits which are integrated with the large area circuit is desired, so as to reduce the number of connections to the integrated circuit.

U.S. Pat. No. 5,148,030 discloses a photon counting type radiation image detecting apparatus having a reading circuit which enables the number of lead wires from the pixel sensing array to an image display device to be reduced. When a pixel detects the presence of a photon, an associated circuit generates a binary word which represents that pixel, and the circuit also outputs a signal indicating the level of energy of the incident photon. Thus, an output for each pixel is no longer required in order to determine which pixel is active. Instead, only as many outputs are required as there are digits in the binary word representing each pixel. However, the circuit of U.S. Pat. No. 5,148,030 does not enable addressing of each pixel of the array and also relies upon the fact that photons are only incident upon one pixel at any time.

SUMMARY OF THE INVENTION

The present invention seeks to provide an array reading or addressing circuit which enables the signals stored in an array of electrical elements to be individually read and which reduces the number of connections to the array of electrical elements.

According to a first aspect of the present invention, there is provided a multiplexing circuit for reading electrical signals produced by a plurality of electrical elements, the circuit comprising a signal reading device and a plurality of terminals, each terminal being connected to the signal reading device through a respective switch, and each electrical element being connected to a unique combination of the terminals, such that when a switch is in a conducting state, electrical signals of those electrical elements connected to the respective terminal are fed, in combination, to the signal reading device, means being provided for processing the signals received by the signal reading device for different combinations of switch states, thereby enabling the signal from each electrical element to be determined.

The circuit of the invention enables signals from each electrical element to be read out by sequentially reading the signals from different combinations of elements. Such an approach is appropriate where the signals of the electrical elements remain constant during the period of time during which the different combinations of electrical element signals are read. The number of terminals required in order to address all of the electrical elements is equal to the number of bits in a binary word of sufficient length to represent the number of electrical elements.

Preferably, the electrical elements comprise pixels of an image sensor device. In this case, the circuit of the invention is particularly suited to an image sensor for which the image to be reproduced is not rapidly changing, since a number of sequential pixel measurements are required. The electrical elements may each comprise a column of pixels of a two dimensional image sensor device, and a selected row within each column may be addressed by a conventional row driver circuit. In this case, the circuit comprises the column multiplexing circuit of a two dimensional array.

According to a second aspect of the present invention, there is provided a multiplexing circuit for addressing a plurality of electrical elements, the circuit comprising an address signal generating device and a plurality of terminals, each terminal being connected to the address signal generating device through a respective switch, and each electrical element being connected to a unique combination of the terminals, such that when a switch is in a conducting state, an addressing signal is applied to those electrical elements connected to the respective terminal, means being provided for reading the output signals, in combination, of the addressed electrical elements and for processing the output signals received for different combinations of switch states, thereby enabling the output signal from each electrical element to be determined.

In this case, each electrical element preferably comprises a row of pixels of a two dimensional image sensor device. Thus, the second aspect of the invention provides a row driver circuit for an array of electrical elements. In such a case, a conventional column reading circuit may be provided for reading the output signals of the columns, but a multiplexing circuit in accordance with the first aspect of the invention may be provided for reading combinations of columns.

Each electrical element is preferably connected to its respective terminal or terminals through a respective isolating device or devices, which may comprise a switching diode or diodes. The isolating devices may be formed of the same technology type as the electrical element (e.g. diodes). The isolating devices can then be integrated with the circuit of the electrical elements so that the terminals are the outputs from the large area circuit.

The output signal reading device preferably has an output which represents the sum of the signals of the electrical elements connected to the device and may comprise an integrating charge sensitive amplifier.

The invention also provides an image sensor comprising an array of rows and columns of image sensing pixels, the columns of pixels being read by the circuit of the first aspect of the invention, and/or the rows being driven by the circuit of the second aspect of the invention.

BRIEF DESCRIPTION OF THE DRAWING

These and other features of the present invention, and their advantages, are illustrated specifically in the embodiments of the invention now to be described, by way of example, with reference to the accompanying drawings, in which;

FIGS. 4A and 4B show two tables explaining the operation of the circuit of FIG. 3.

DESCRIPTION OF THE PREFERRED EMBODIMENTS

Figure 1:
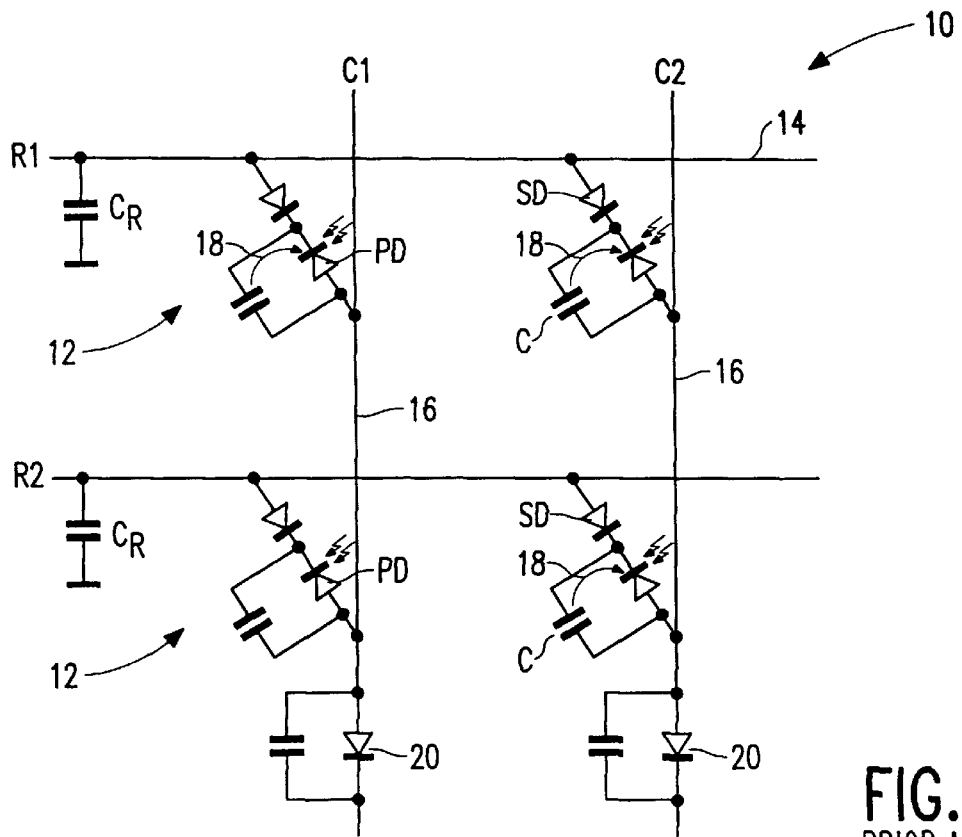
FIG. 1 is a diagram to explain the operation of an image sensor pixel.

FIG. 1 shows an example of four pixels of a known charge storage device in the form of an image sensor 10. Although only four pixels 12 are shown, the image sensor 10 will comprise a two dimensional matrix of rows and columns of pixels with associated row 14 and column 16 conductors.

Each pixel 12 comprises a photosensitive diode PD and a switching diode SD coupled in series between the associated row conductor 14 and column conductor 16. In the examples shown, the switching diode SD and photodiode PD are arranged with the cathodes coupled together, although they may be connected oppositely. A capacitor C is shown coupled across the photosensitive PD. This capacitor C may be the parasitic capacitance of the photosensitive diode PD or may be an additional capacitor added to increase the dynamic range of the image sensor 100.

Conventional pixels as shown in FIG. 1 may be operated in one of two ways. If a photodiode is held reverse biased or is electrically isolated, then light incident upon the photodiode will generate a minority carrier current in the photodiode as shown by arrow 18.

The first method of reading an image sensor pixel involves directly measuring this current. Thus, the switching diode SD is forward biased by applying a suitable row voltage. During this time, the photodiode is reverse biased so that the only current that is allowed to flow is indeed the photodiode current, which flows between the row conductor 14 and the column conductor 16. The current is measured using charge sensitive amplifiers 20 coupled to the column conductors.

A second way of reading an image sensor pixel is to charge the photodiode capacitances C of a row by means of a positive row voltage, and then to allow the capacitors to discharge, so that they supply the photodiode current during the so-called integration period. During this period the switching diode is reverse biased (namely the row voltage is low) while the capacitor discharges, in dependence upon the incident light. When the image sensor pixel is to be read, a high row signal is applied once more and the current that flows between the row conductor 14 and the column conductor 16 represents the current required to recharge the photodiode capacitance C, which represents the total illumination of the photodiode over the whole of the previous integration period. Clearly, for this to be possible, the switching diode must not turn on during the integration period; the row voltage must therefore remain low. Again, the charge sensitive amplifier 20 reads the current flowing in the column conductor.

Figure 2:
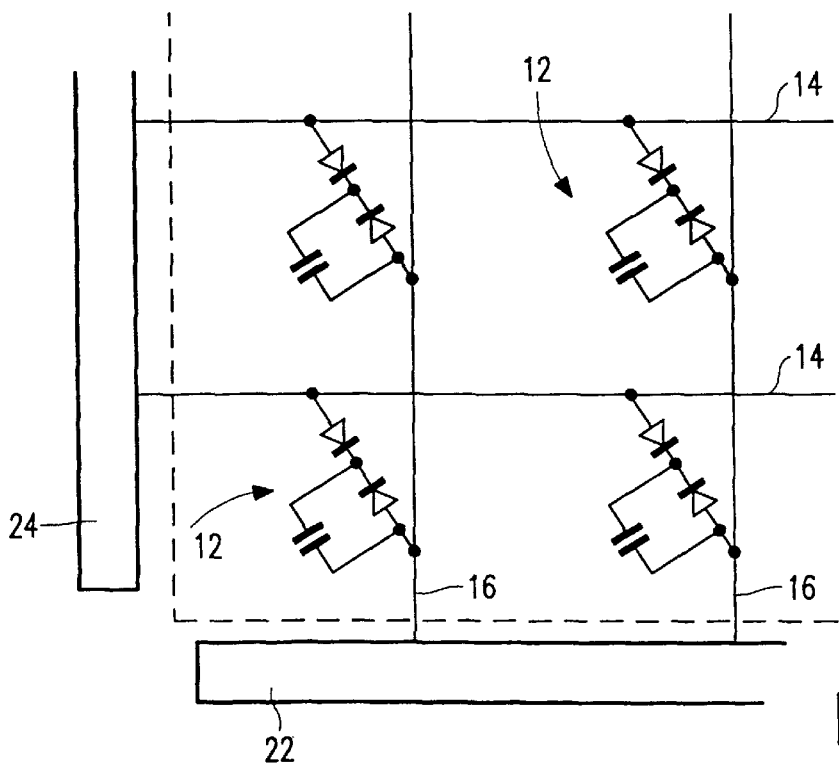
FIG. 2 shows a conventional image sensor device.

An image sensor is shown in FIG. 2, and as shown, a column circuit 22 is provided which comprises the charge sensitive amplifiers 20, as well as a row driver circuit 24 to provide the required high and low row signals. The column circuit may include an A/D converter for the output current signals of the amplifiers 20.

The invention concerns a multiplexer circuit which may be applied to the column reading circuit and/or to the row driver circuit, so as to reduce the number of connections to the array.

A known problem with the prior art is that since the column circuit 22 and row driver circuit 24 are not integrated onto the substrate of the image sensor array, interconnections must be provided between each column 16 and the column circuit 22 and between each row 14 and the row driver circuit 24. The dotted line in FIG. 2 represents the extent of the integrated image sensor circuit. Multiplexer circuits are therefore desired which may be integrated on to the substrate of the image sensor (or other array of device elements) so as to reduce the number of outputs from the substrate.

Figure 3:
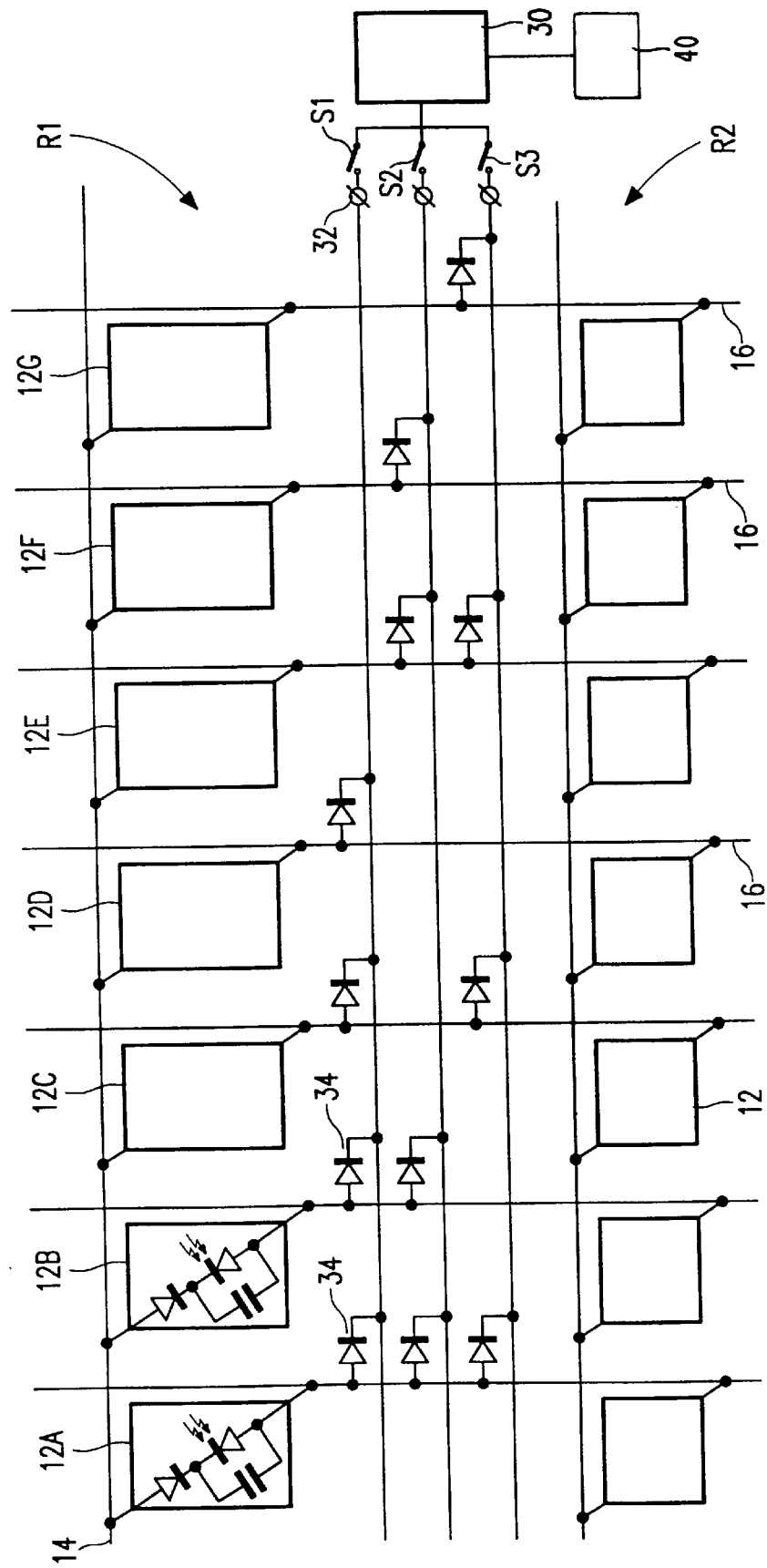
FIG. 3 shows a first embodiment of multiplexer circuit according to the invention, applied as a column reading circuit.

FIG. 3 shows an array reading circuit according to the invention. In order to explain the operation of the circuit of the invention, FIG. 3 represents the circuit when used in conjunction with an array of image sensing pixels comprising rows and columns, each row having seven pixels 12. Clearly, an image sensor in fact comprises hundreds or thousands of rows and columns and the circuit may be applied to the addressing of one or two dimensional arrays of image sensing or other electrical elements.

In the image sensor represented in FIG. 3, each row R is addressed by a row driver circuit (not shown) as is conventional. Thus, a high voltage is applied to the selected row conductor 14 in order to address that row of pixels 12. Conventionally, each column conductor 16 is supplied to a column circuit which includes a charge sensitive reading device for each column of pixels 12.

The circuit of the invention comprises a signal reading device 30 which may comprise a charge sensitive amplifier and which has a plurality of input terminals 32. Each input terminal 32 is connected to a common input of the signal reading device 30 through a respective switch S1, S2, S3. The output of each image sensor 12, to an associated column conductor 16, is fed to one or more of the terminals 32 through respective diodes 34. Each pixel 12 is in this way connected through diodes 34 to a unique combination of terminals 32. The number of pixels which may be connected to the terminals 32, with each pixel being connected to a unique combination of terminals 32, is equal to the maximum number of combinations of a binary word of n of binary digits corresponding to the number, n, of terminals 32. In the example shown, a three digit binary word has eight combinations so that three terminals are required to address a row of seven pixels. However, each pixel 12 must be connected to at least one terminal 32, so that a pixel 12 which is not connected to any terminal 32 is excluded. Thus, a number n of terminals 32 can provide unique combinations for $2^n-1$ pixels.

The diodes 34 act as isolating devices which prevent the signals fed to one terminal 32 interfering with the signals fed to a different terminal. The diodes provide a conducting path for the pixel current to the associated terminals 32 whilst isolating the terminals from each other, so as to prevent current flowing between the terminals.

The operation of the device shown in FIG. 3 will now be explained with reference to FIGS. 3 and 4. The signal reading device 30 holds the voltages of the terminals 32 at zero volts when the associated switch S is closed. In this way, when a row conductor 14 is selected by application of a high row voltage, the pixels 12 of that row conduct a current which depends upon the present or previous level of illumination of the pixel 12. A conducting state of the switches S1, S2, S3 provide conducting paths for the signals of the pixels 12 to the signal reading device 30. Assuming row R1 is selected, if switch S1 only is closed, signals from pixels 12A to 12D will be fed to the reading device 30, which receives the combination of the currents of the signals from those four pixels. Clearly, this signal does not enable the individual pixel values of those four pixels to be obtained, and measurements must be taken for all combinations of switch positions.

FIG. 4 shows the measurements obtained by the signal reading device 30 for the various possible combinations of switch positions. As shown in FIG. 4 part A, the seven possible switch settings (excluding the three switches being open) provide seven different signals to the reading device 30, each representing a different combination of pixel signals, represented in the table by the letters A to G corresponding to the pixels shown in FIG. 3. Part B of FIG. 4 shows the processing of the seven measurements which is required in order to derive the individual pixel measurements.

This processing requires twelve subtractions which may be carried out by a digital processing unit 40 which receives the signals from the signal reading device 30, which itself then includes an A/D converter. The number of arithmetic operations required increases as the number of pixels which are associated with one signal reading device increases.

The circuit of the invention requires a number of measurements that corresponds to the number of pixels. These measurements may not be carried out in parallel and, as a result, the circuit of the invention is preferably for use with an array of electrical elements which record signals which remain static. For example, the circuit is particularly applicable to a document scanning image sensing device for which the signals produced by the pixels 12 remain constant during the image sensing procedure. However, this circuit of the invention may be applied to an image sensing device which relies on direct current read of the pixel photodiode currents, or relies on measurement of the charge stored by an image sensor pixel during a so-called integration period.

For example, in the direct current read mode of operation, the measurements M1 to M7 may be carried out sequentially so that the complete signals for a particular row are obtained before a subsequent row is addressed (by a row driver signal). In order to ensure that the instantaneous photodiode current is being measured, the row signal may include a refresh pulse in order to recharge the photodiode capacitances before the measurements are taken by the signal reading device 30. For example, during the measurement M1 (with switch S3 closed) charge may be developing within pixels 12B, 12D and 12F, since these pixel photodiodes remain isolated. Therefore pixels 12B and 12F may need to be refreshed before measurement M2 is taken. This is because some charge storage will have taken place for these pixels, which will not have taken place for pixel 12E, having just been read during measurement M1. This refreshing may be achieved by obtaining a reading from the signal reading device 30 shortly after the associated switch (S2 for measurement M2) is closed, so that the initial capacitor recharging current is not measured, but only the instantaneous photodiode current. Alternatively a separate refresh pulse for all pixels may be desired between each measurement M.

The circuit of the invention may also be controlled to enable the stored charge of each pixel to be measured. In this case, it is desired that each pixel being measured should have been isolated for the same length of time. This is required so that the same period of time for charge storage elapses, so that the signals are all comparable. This may be achieved by taking a particular measurement M1, for example, for each row in turn and then proceeding to take subsequent measurements M2 for each row in turn. In this way, a constant time gap (corresponding to the time required to take a single measurement from each row) elapses between each measurement M for each row. At the end of the measurement Mn for a particular row, all of the pixels in that row may be refreshed after the row reading pulse, so that all of the pixels are subject to the same length of integration period before the next row reading pulse Mn+1. For example, the switches S1, S2, S3 may all be switched to a conducting state at the end of each measurement M in order to recharge the photodiode capacitances of each pixel. Again, the use of the reading circuit requires the signals of the pixels 12 to remain substantially constant during the successive reading operations.

The measurement of the pixel values requires one or more of the switches S1, S2, S3 to be closed, and a condition in which all three switches are open clearly cannot be used to obtain pixel measurement at the signal reading device 30. However, this condition may be used in order to obtain a reference output of the signal reading device 30 in order establish a zero level for the charge sensitive integrator. It is to be noted, however, that correction using this zero level is in fact only required for the error obtained in the value of pixel 12A since for the other pixels such a static error cancels out by virtue of the subtractions shown in FIG. 4 part B.

Figure 5:
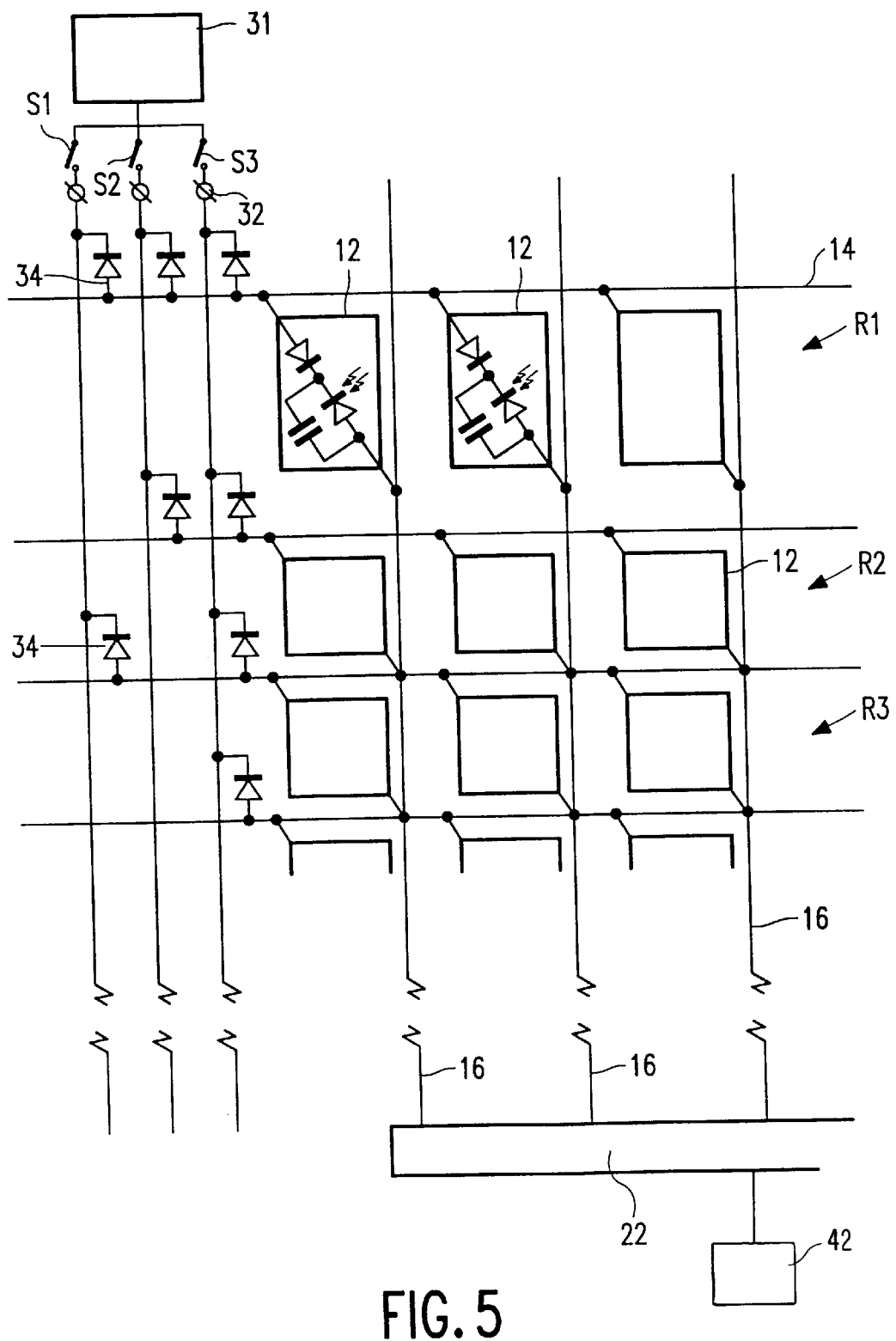
FIG. 5 shows a second embodiment of multiplexer circuit according to the invention, applied as a row driving circuit.

The circuit of the invention is thus suitable for use as a column reading circuit. However, the circuit may also provide a multiplexing row driver circuit. In this case, the circuit provides the row driving pulses to different combinations of rows, and the signals read at the column outputs are processed in order to obtain the individual signals (i.e. for each row) within the column output signals. FIG. 5 shows the layout of such a circuit. The multiplexing circuit has the same arrangement as in FIG. 3, and the same reference numerals are used for like components. The diodes 34 provide a conducting path from an address signal generating device 31 to the row conductors 14. The closing of the switches S1 to S3 result in different rows being addressed, so that the signal read for each column conductor 16, by the column circuit 22, represents a combination of pixels from different rows. Again, the skilled addressee will appreciate that appropriate processing, such as a digital processing unit 42, analogous to unit 40 can be used to obtain the individual pixel signal values. In addition, the column circuit may also include the multiplexing arrangement described with reference to FIG. 3.

The circuit of the invention requires the A/D converter of the column reading circuit to have an increased dynamic range, since a number of pixel values are to be read simultaneously. It is possible to switch the gain of the charge sensitive amplifier integrator depending upon the number of signals being measured for a particular measurement, and the level of the input signal.

In the example shown, only one read out device 30 or row signal generating device 31 is shown. Alternatively, the large area circuit may be partitioned into small subsections each having their own signal reading device 30 or row signal generating circuit 31. In such a case, the switches S of each signal reading device 30 or row signal generating circuit 31 may be operated simultaneously or they may be operated independently. This division of the pixels into sections may be desired in order to reduce the total number of arithmetic operations which are required, since, for a single device 30, 31, this number increases at a greater rate than an increase in the number of pixels associated with the device.

Although the circuit of the invention has been described with reference to an image sensor, and particularly a two dimensional image sensor, it can equally be applied to an array of other electrical elements providing a substantially static electrical image to be read out.

The components of the circuit of the invention which are to be integrated with the substrate of the array of electrical elements are preferably chosen to be of the same technology type as the device elements of the array. When the multiplexer is to be used with an image sensor having pixels arranged as shown in FIG. 1, thin film diodes are used for both the multiplexing circuit (for diodes 34) and for the array. All these diodes may be formed simultaneously on the device substrate using the same processing steps.

The device elements of the array may, however, comprise thin film transistors. Thus, for example, each pixel may comprise a known configuration of two switching transistors and a photo conductor. In this case, the diodes 34 of the multiplexer circuit may be formed as diode-connected thin film transistors, i.e. the gate and drain of the transistor may be coupled together as one electrode of the circuit element.

In the circuits shown in FIGS. 3 and 5, the terminals 32 provide the interface between the integrated large area circuit of the image sensor array and the external control circuitry. As described above, it may be desired to divide the rows or columns into blocks, for example if it is desired to limit the number of processing subtractions required. However, the switches S1 to S3 for each block may be operated simultaneously, provided an additional select switch is in place for selecting each block. This block select may, for example, be a switch at the common input (in the case of a column reading circuit of FIG. 3) or common output (in the case of a row driver circuit of FIG. 3) of the signal reading or generating device, respectively. If the switches S1 to S3 for each block may be integrated into the large area circuit, the number of connections to the large area circuit may be reduced to one line for each block together with the set of switch control lines which are common to each block.

As is known in the art, the image sensor may be as transparent as possible so that it may then be placed on top of a display, for example, without significantly obscuring the display.

An image sensor including a multiplexer circuit of the invention may be designed as a document scanner. A very large area image sensor may be formed capable of imaging an A4 size page at the resolution of 300 dpi. The present invention permits the number of column outputs and/or row inputs to be reduced. Although specific embodiments of the present invention have been illustrated as reading rows of image sensors, the present invention may be used with other array devices, for example liquid crystal displays or memories and data stores.

From reading the present disclosure, other modifications will be apparent to persons skilled in the art. Such modifications may involve other features which are already known in the design and use of electrical or electronic circuits and component parts thereof and which may be used instead of or in addition to features already described herein.

What is claimed is:

1. A multiplexer circuit for reading electrical signals produced by a plurality of electrical elements, the circuit comprising a signal reading device and a plurality of terminals, each terminal being connected to the signal reading device through a respective switch, and each electrical element being connected to a unique combination of the terminals, at least one of said electrical elements being connected to more than one of said terminals, such that when a switch is in a conducting state, electrical signals of those electrical elements connected to the respective terminal are fed, in combination, to the signal reading device, means being provided for processing the signals received by the signal reading device for different combinations of switch states, thereby enabling the signal from each electrical element to be determined.

2. A circuit as claimed in claim 1, wherein the electrical elements comprise pixels of an image sensor device.

3. A circuit as claimed in claim 2, wherein each electrical element comprises a column of pixels of a two dimensional image sensor device.

4. A multiplexer circuit for addressing a plurality of electrical elements, the circuit comprising an address signal generating device and a plurality of terminals, each terminal being connected to the address signal generating device through a respective switch, and each electrical element being connected to a unique combination of the terminals, at least one of said electrical elements being connected to more than one of said terminals, such that when a switch is in a conducting state, an addressing signal is applied to those electrical elements connected to the respective terminal, means being provided for reading the output signals, in combination, of the addressed electrical elements and for processing the output signals received for different combinations of switch states, thereby enabling the output signal from each electrical element to be determined.

5. A circuit as claimed in claim 4, wherein the electrical elements comprise pixels of an image sensor device.

6. A circuit as claimed in claim 5, wherein each electrical element comprises a row of pixels of a two dimensional image sensor device.

7. A circuit as claimed in claim 1, wherein each electrical element is connected to the respective terminal or terminals through a respective isolating device or devices.

8. A circuit as claimed in claim 7, wherein each isolating device comprises a switching diode.

9. An image sensor array comprising rows and columns of image sensing pixels, the rows being addressed by a row driver circuit, and the columns being read by a reading circuit including a multiplexer circuit as claimed in claim 1.

10. An image sensor array comprising rows and columns of image sensing pixels, the rows being addressed by a row driver circuit including a multiplexer circuit as claimed in claim 4.

11. A circuit as claimed in claim 4, wherein each electrical element is connected to the respective terminal or terminals through a respective isolating device or devices.

12. A circuit as claimed in claim 11, wherein each isolating device comprises a switching diode.

13. An image sensor array comprising rows and columns of image sensing pixels, the rows being addressed by a row driver circuit, and the columns being read by a reading circuit including a multiplexer circuit as claimed in claim 2.

14. An image sensor array comprising rows and columns of image sensing pixels, the rows being addressed by a row driver circuit, and the columns being read by a reading circuit including a multiplexer circuit as claimed in claim 3.

15. An image sensor array comprising rows and columns of image sensing pixels, the rows being addressed by a row driver circuit including a multiplexer circuit as claimed in claim 5.

16. An image sensor array comprising rows and columns of image sensing pixels, the rows being addressed by a row driver circuit including a multiplexer circuit as claimed in claim 6.

* * * * *